A. S. O'NEIL.
PROCESS FOR SOLVENT RECOVERY.
APPLICATION FILED MAR. 3, 1919.
1,381,002.
Patented June 7, 1921.
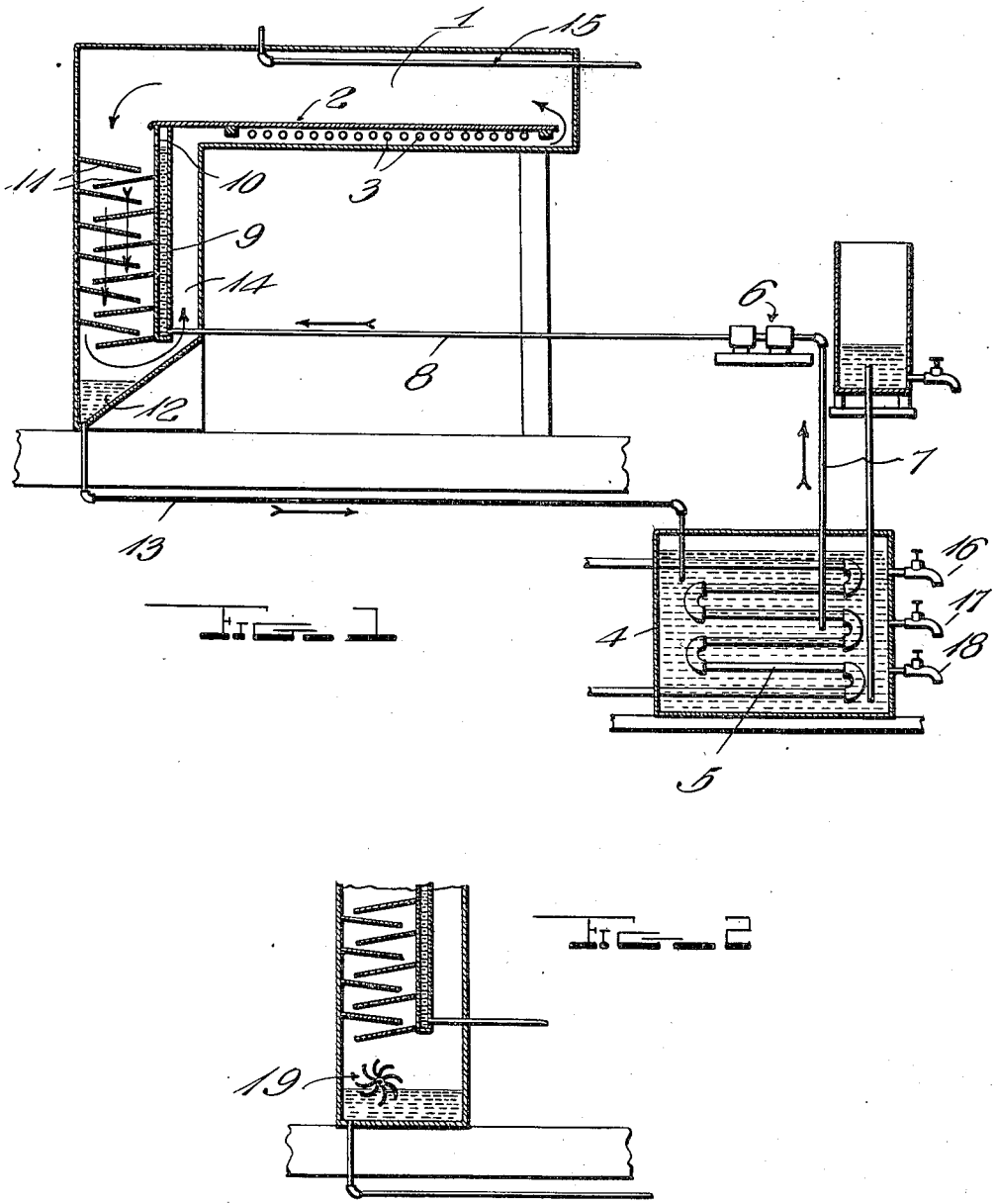
Witness
Inventor
Arthur S. O'Neil
By H. B. Willson & Co.
Attorneys

UNITED STATES PATENT OFFICE.

ARTHUR SAMUEL O'NEIL, OF WILMINGTON, DELAWARE.

PROCESS FOR SOLVENT RECOVERY.

1,381,002.   Specification of Letters Patent.   Patented June 7, 1921.

Application filed March 3, 1919. Serial No. 280,282.

*To all whom it may concern:*

Be it known that I, ARTHUR SAMUEL O'NEIL, a citizen of the United States, residing at Wilmington, in the county of New Castle and State of Delaware, have invented certain new and useful Improvements in Processes for Solvent Recovery; and I do declare the following to be a full, clear, and exact description of the invention, such as will enable others skilled in the art to which it appertains to make and use the same.

The present invention relates to the recovery of solvents and other liquids used in the arts, and will be described in reference to the recovery of solvents in the manufacture of artificial leather, or other coated fabrics, or rubber goods, although the process is one of general application.

The process depends upon the evaporation of the solvent liquid, the removal of vapors from the mixture of air and solvent vapor, by direct contact thereof with a chilling liquid, which acts as an absorbent for the material carried in vapor form. The complete process involves two stages, in cyclic relation, these being the evaporation of the solvent liquid, and its absorption in a chilling liquid of the character hereinafter referred to, direct contact of the vapor-laden air with the chilling liquid being a valuable feature of the process.

The solvents employed in various arts, to the recovery of which the present application is applicable, may be divided into two classes, namely those which are soluble in cold water or brine, and those which are insoluble therein. As examples of the first of such classes, I would mention ethyl acetate, amyl acetate, butyl acetate, alcohol, wood alcohol, acetone or other ketones, wood oils, acetone oils, and the like. When these solvents, or mixtures thereof are to be recovered, the chilling medium preferably employed is the liquid solvent itself, that is to say in the recovery of, say acetone, by drying a material containing a substantial quantity of acetone, I also preferably use acetone, in a refrigerated state, as the cooling and absorbing medium. In this way acetone is recovered directly, whereas in such processes as have heretofore been proposed in which an absorbent is used, it has been customary to employ a relatively non-volatile liquid as the absorbent, which operation produced a mixture of (a solution of) the volatile solvent with the non-volatile absorbent. Heavy fuel oil has heretofore been used or proposed as an absorbent for vapors of volatile solvents, the first result of the absorption being a solution or mixture of the fuel oil and solvent, from which the solvent had to be separated by distillation or otherwise, thereby requiring the use of extensive apparatus and of no inconsiderable quantity of fuel or other heating agent, whereas in my process, distillation is not necessary.

The process forming the object of my present invention may be carried out in simple apparatus, such as that shown in the accompanying drawing, in which Figure 1 is a vertical section of an apparatus suitable for the purpose, and Fig. 2 is a view of the lower part of a modified form of the absorption portion of the device, showing a modification.

In carrying out the process, I place in the evaporation chamber 1, upon a flooring 2, or suspended above this flooring, the material containing volatile solvents which it is desired to recover. Below the flooring I place suitable steam coils 3, or other equivalent heating means. Assuming that ethyl acetate is the solvent to be recovered, I place in the tank 4 a suitable quantity of ethyl acetate, which tank is refrigerated or kept cold by means of a suitable refrigerating coil 5. By means of the pump 6, and pipes 7 and 8, I supply to the hollow wall 9, forming one end of the condensing and absorption chamber, a sufficient quantity of the said solvent, to enable the same to completely fill said hollow wall, and to overflow at 10 onto the top inclined plate 11. The liquid then passes downwardly over the said plate 11, finally flowing into the hoppered collection receptacle 12, from which the said liquid flows through pipe 13 back into the tank 4, after which the liquid continues to circulate, during the entire process, through pipe 7, pump 6, pipe 8, hollow wall 9, opening 10, downwardly over the successive baffles 11, into the bottom 12 and by pipe 13 back into the tank 4. As the solvent evaporates in the compartment 1, the mixture of air and solvent vapor being heavy, finds its way into the absorption and condensing chamber, and by the current of refrigerated liquid flowing downwardly over the baffles 11 therein, the mixture of air and solvent vapor is forced likewise to travel downwardly through said chamber, wherein the cold solvent liquid causes the condensation of a large part of the solvent vapor carried therein. The air issuing at the bottom of the absorption chamber, rises through the passage 14, this being assisted by the heat imparted to the air below the flooring 2 by coils 3. There is thereby produced a cyclic flow of the air as indicated by the plain arrows in the drawing, one portion of this cyclic path being in common with the cyclic path of liquid solvent as indicated by the tailed arrows in the drawing. On account of the fact that the solvent liquid entering through 10 is refrigerated, and the fact that this refrigerated liquid is spread out in a very thin film on the baffles 11, a very complete contact of the liquid and vapor-charged air is secured, thereby producing an efficient condensation of the vaporized solvent.

It is of course possible to employ in the system a different gaseous medium instead of air, and as examples of other gases to employ, purified chimney gases, nitrogen, or other inert gases are referred to.

In order to assist the vaporization of the solvents in compartment 1, additional heating coils as shown at 15 may be employed.

In the above example of the process I have discussed particularly the recovery of a solvent which is soluble in water. There are other classes of solvents which are insoluble in water or in brine, examples of such being carbon disulfid, carbon tetrachlorid, naphtha, benzol, benzin and the like. When working with materials containing such solvents either the solvent itself may be employed as the chilling and absorbing medium, or cold water or cold refrigerated brine may be used as the chilling liquid. The water or brine would be either heavy or lighter than the liquid solvent, and for this purpose the tank 4 may be provided with a series of draw-off cocks as indicated at 16, 17, and 18. The pipe 7, in such a modification of the process can be arranged to draw from either the middle portion or upper portion or bottom of the tank 4.

The device shown in Fig. 2 constitutes a modification, in which the chilling action and the condensation in the bottom of the condensing compartment is assisted by producing a spray of the liquid therein, by means of the device 19.

It will be noted that while many of the processes heretofore proposed for the recovery of solvents include as a necessary element, a fan or other mechanical device for producing a forced circulation of the air or gas current, no mechanical means for this are necessary in the process of my present invention. Also in the operation of the solvent recovery devices previously used, there is a period at the beginning and at the ending of the operation where the atmosphere in the chamber consists of an explosive mixture of air and the inflammable vapors. In the process of the present case this condition cannot arise, because owing to the exposed surface of the chilling medium, the air is always saturated or substantially saturated with vapor of solvent or with moisture.

A further advantage resides in the great simplicity of the entire apparatus, as compared with the apparatus used in many of the processes heretofore proposed, the entire apparatus used being that shown in Fig. 1 of the drawing. In the apparatus to be used, the absorption chamber should always be placed, as illustrated in Fig. 1, at a lower level than the evaporation chamber, in order to allow the heavy solvent vapors, as produced, to flow downwardly into the absorption or condensing chamber.

I do not claim herein, the drying of materials containing water, i. e., what are ordinarily referred to as "wet materials."

I claim:

1. In the recovery of solvents, which when vaporized in a gas atmosphere, produce vapor mixtures substantially heavier than the said gas atmosphere alone, the process of allowing a current of heated gas to pass in contact with material carrying such solvent to be recovered, and then allowing the solvent laden gas current to travel downwardly through a tortuous passage containing liquid solvent in a refrigerated condition, in direct contact with said solvent-vapor-laden gas current and allowing the gas to repeat the cycle of operations, the travel of the gas-vehicle being effected solely by the gas-heating operation and the contact with the refrigerated solvent.

2. In the process of claim 1, the step of supplying, as refrigerated solvent, a liquid of the same kind as that which is to be recovered.

3. In the recovery of solvents, which when vaporized in a gas atmosphere, produce vapor mixtures substantially heavier than the said gas atmosphere alone, the step of subjecting a cyclic current of gaseous vehicle, at one part of its travel to material containing such volatile solvent and heat, and at another part of its travel to refrigerated solvent of the same character, such last mentioned treatment being at lower level than such first mentioned step, and the said refrigerated solvent traveling in the same direction as the gaseous vehicle in contact therewith.

4. The step of passing a current of a gas carrying a vaporized volatile solvent downwardly through a tortuous passage, in contact with refrigerated liquid with which such volatile solvent in a liquid state does not mix to form a solution.

5. A process of recovering volatile solvent of a character which, when the vapors thereof are mixed with an inert gaseous vehicle, forms a mixture heavier than such gaseous vehicle itself, which comprises placing material containing such volatile solvent in a chamber, supplying a current of warm inert gas to such material, whereby said gas takes up the vapors of such solvent, allowing the resulting gas-vapor mixture to flow downwardly over obstructions kept wet with a downwardly flowing current of such solvent in a refrigerated condition, whereby such vapor is, at least in part, condensed, and directing the residual inert gas back into contact with such material containing volatile solvent.

6. A process of recovering volatile solvent of a character which, when the vapors thereof are mixed with an inert gaseous vehicle, forms a mixture heavier than such gaseous vehicle itself, which comprises placing material containing such volatile solvent in a chamber, supplying a current of warm inert gas to such material, whereby said gas takes up the vapors of such solvent, allowing the resulting gas-vapor mixture to flow downwardly over obstructions kept wet with a downwardly flowing current of a liquid with which such volatile solvent does not mix to form a solution, such liquid being in a refrigerated condition, whereby such vapor is, at least in part, condensed and directing the residual inert gas back into contact with such material containing volatile solvent.

In testimony whereof I have hereunto set my hand.

ARTHUR SAMUEL O'NEIL.